Dec. 15, 1970  J. H. PEREUE ET AL  3,546,782
AUTOMOTIVE WHEEL ALINING APPARATUS
Filed June 25, 1968  5 Sheets-Sheet 4
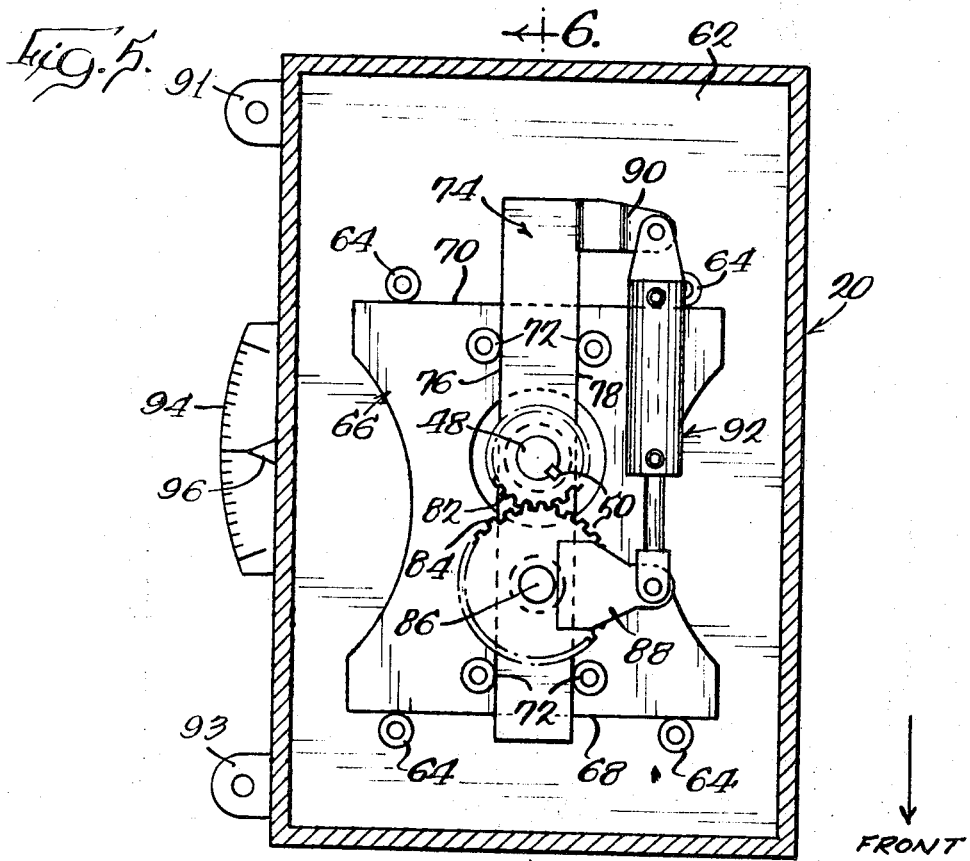
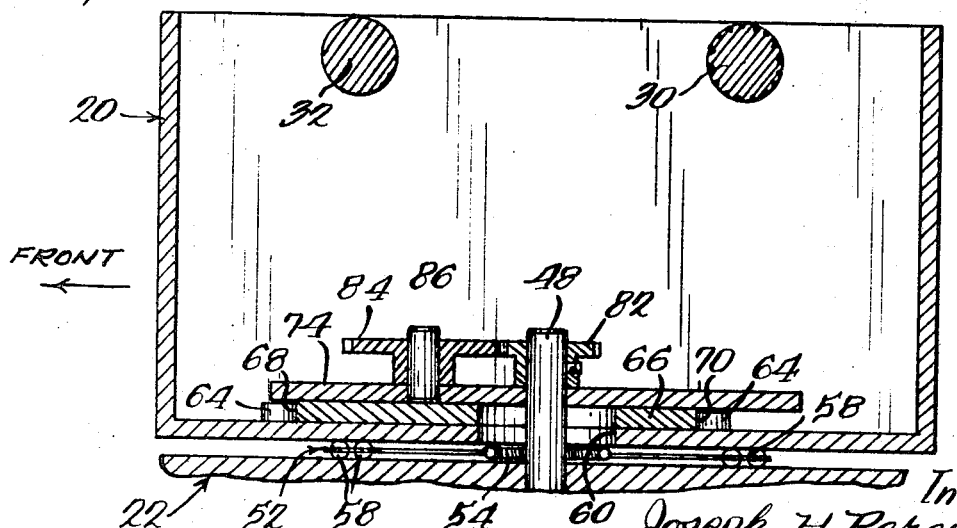
Inventors:
Joseph H. Pereue
Wendell W. Lowry
Milton A. Wertheimer
By Gary Parker
Juettner, Pigott & Cullinan
Attys Dec. 15, 1970    J. H. PEREUE ET AL    3,546,782
AUTOMOTIVE WHEEL ALINING APPARATUS
Filed June 25, 1968    5 Sheets-Sheet 5

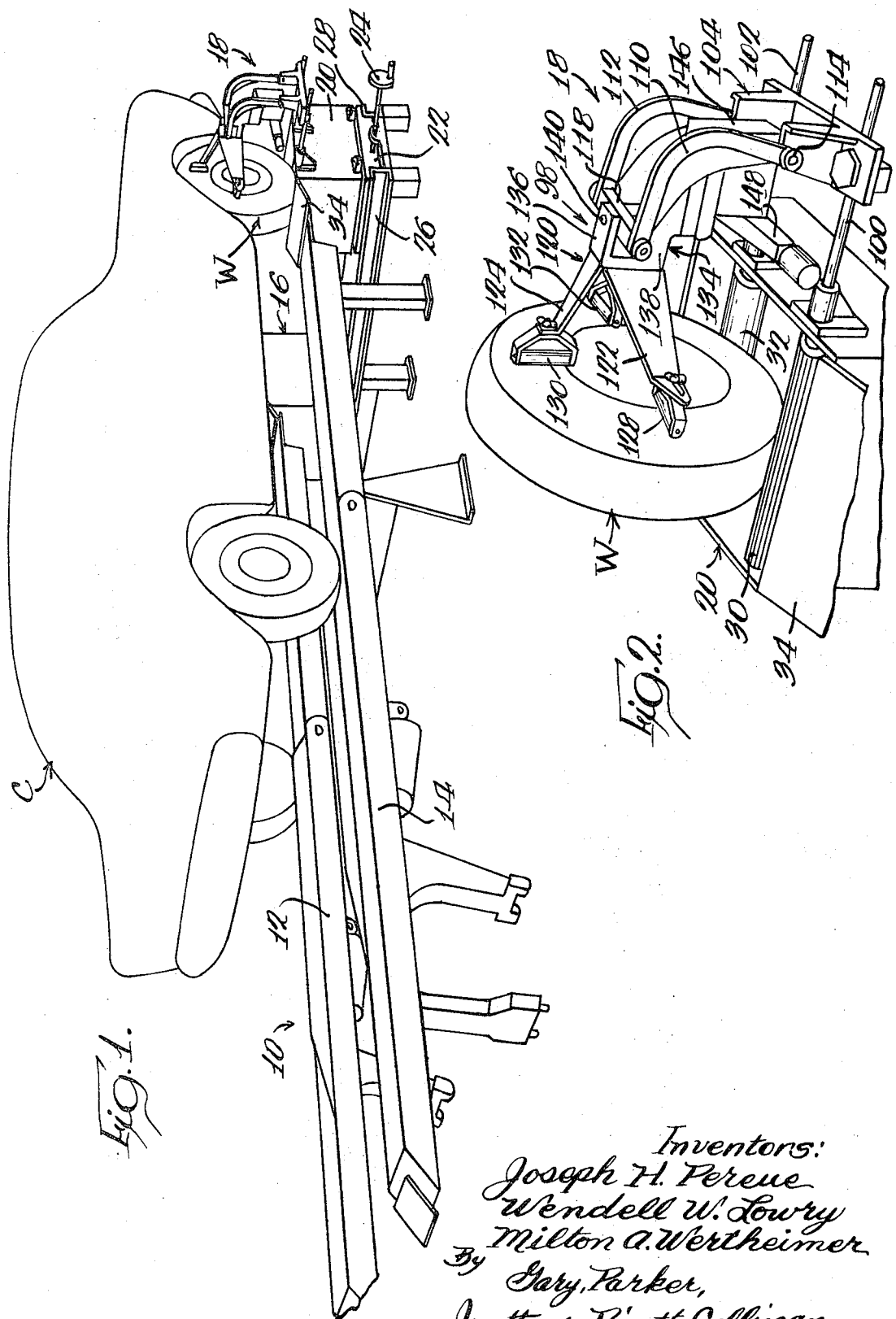

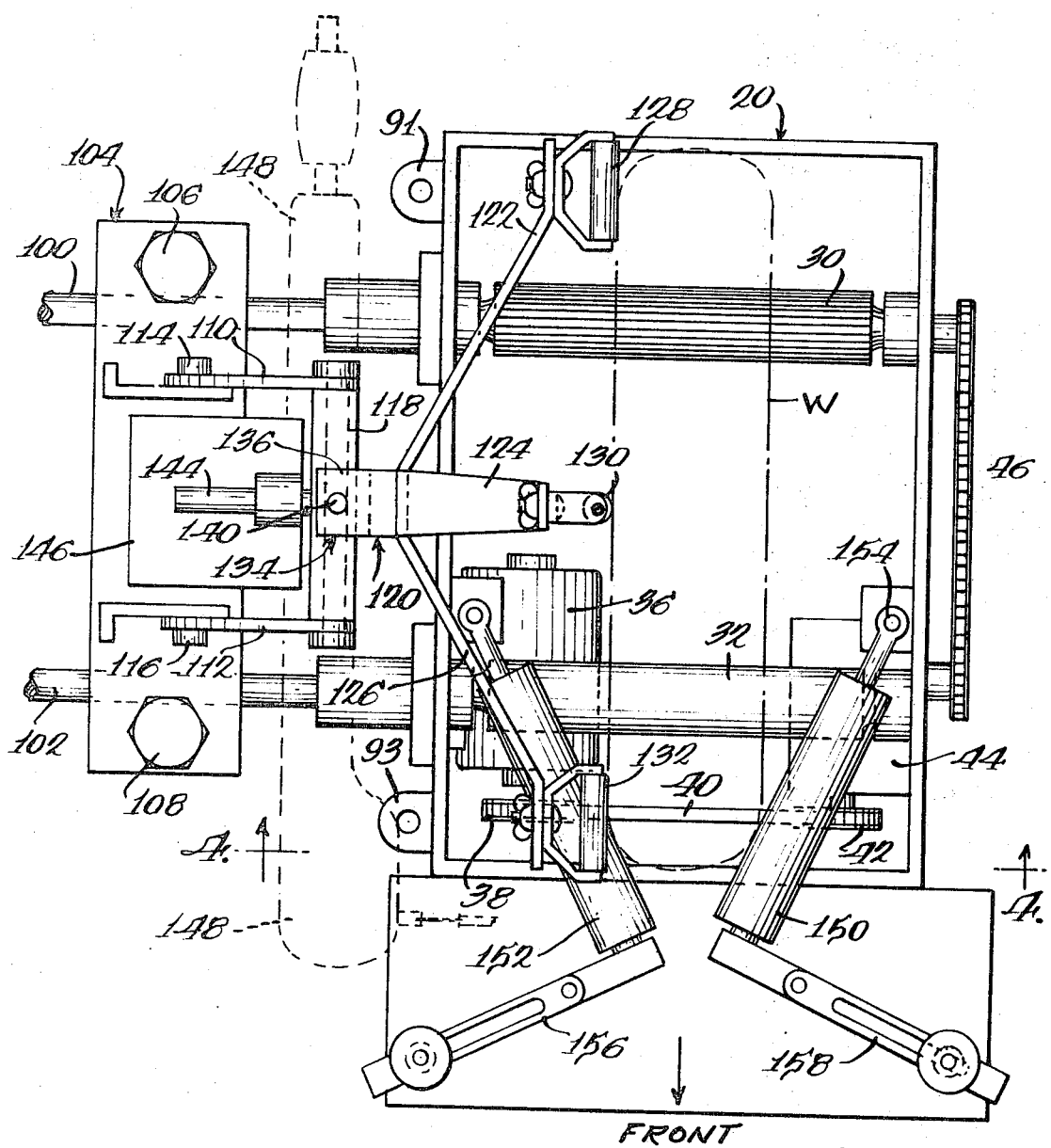

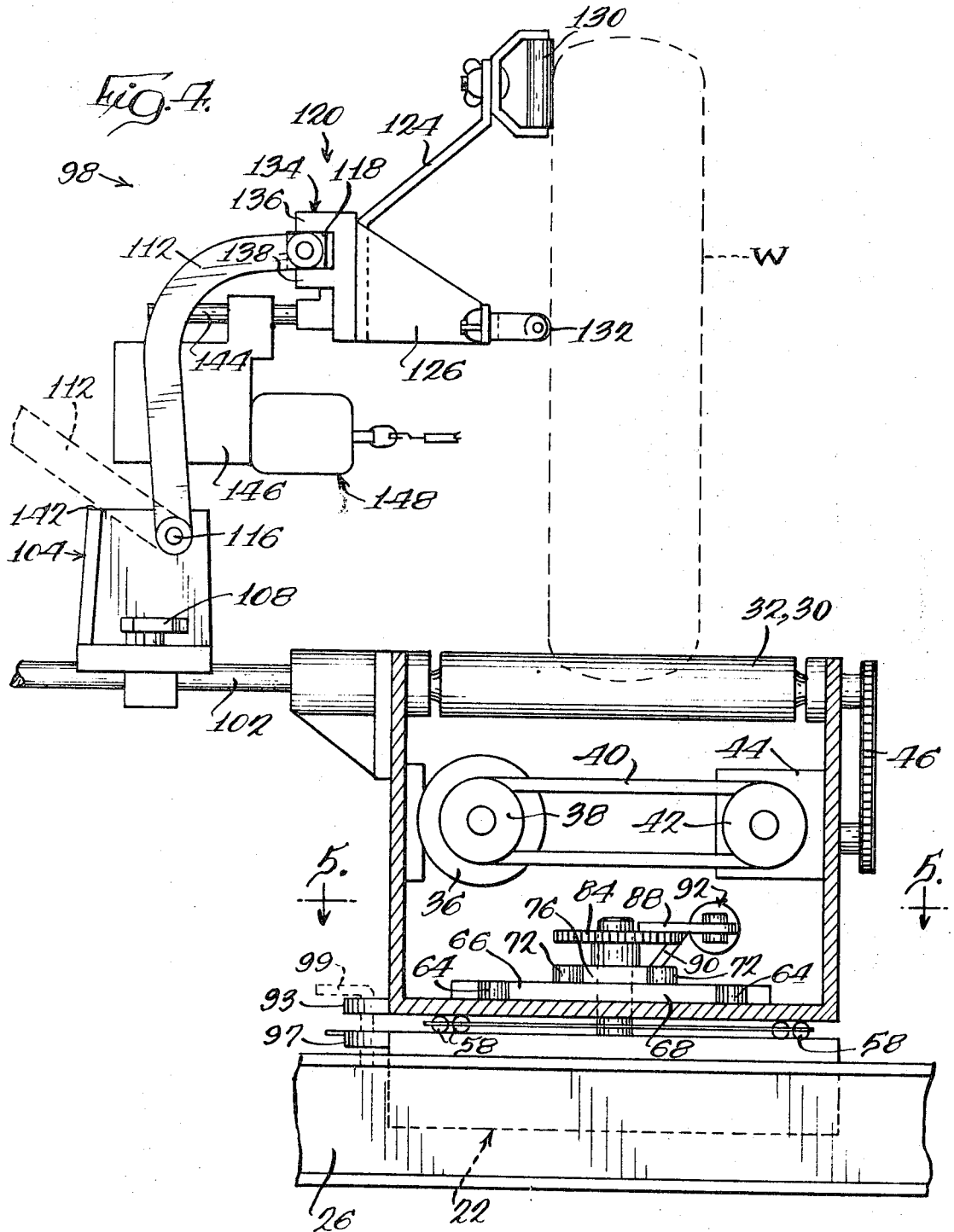

Inventors
Joseph H. Pereue
Wendell W. Lowry
Milton A. Wertheimer
By Gary, Parker,
Juettner, Pigott & Cullinan
Atty's United States Patent Office 3,546,782
Patented Dec. 15, 1970

3,546,782
AUTOMOTIVE WHEEL ALINING APPARATUS
Joseph H. Pereue, Rock Island, Wendell W. Lowry, Milan, and Milton A. Wertheimer, Rock Island, Ill., assignors to Applied Power Industries, Inc., a corporation of Delaware
Filed June 25, 1968, Ser. No. 739,773
Int. Cl. G01b 5/24
U.S. Cl. 33—203.13                                    17 Claims

ABSTRACT OF THE DISCLOSURE

Apparatus for electrically measuring the various wheel alinement angles of automotive vehicle wheels such as camber, caster, toe, turning radius, etc., the apparatus being designed to permit measurement of such alinement angles while the front vehicle wheels are rotating so that measurements reflect normal road-load conditions, and the apparatus including a plurality of sensing arms which contact the side wall of a rotating tire and thereby determine the true plane of the wheel.

BRIEF SUMMARY OF THE INVENTION

It is known in the art to utilize electrical wheel alinement apparatus for measuring the caster and camber of vehicle wheels. A device of the foregoing type is fully described in MacMillan et al. U.S. Pat. 2,765,540, which is assigned to the assignee of the present application. In the latter device there is provided a pendulum which is freely swingable about a horizontal axis. The pendulum carries an armature member, and mounted adjacent the pendulum there are an exciter coil and two pick-up coils. In the operation of the device, the armature-carrying pendulum moves adjacent the exciter coil and pick-up coils in such a manner that the reluctance of the magnetic paths from the exciter core to the cores of the pickup coils is changed by the swing of the pendulum. A properly calibrated current measuring instrument is employed to measure the unbalanced condition of the current through the two pick-up coils in order to interpret the angular position of the pendulum in terms of current flow, the device being mounted from a vehicle wheel so that the position of the pendulum relates to the camber of the wheel. The above-described patent also discloses a galvanometer and related apparatus located remote from the caster-camber unit for measuring the current in a pair of pick-up coils and producing a reading on a remoae viewing screen.

In addition to the foregoing, it is known to provide an electrical device for measuring the toe of vehicle wheels as described in copending application Ser. No. 607,274, filed Jan. 4, 1967, and assigned to the assignee of the present invention. Such device includes a pair of toe arms each suspended from a respective front wheel of a vehicle and each arm carrying a pendulum which is movable about a vertical axis. A tension member is stretched between the free ends of the two pendulums, and electromagnetic means is associated respectively with each of the pendulums for producing a current the magnitude of which is a measure of the angular position of the corresponding pendulum and thus is a measure of the toe of the corresponding vehicle wheel. A galvanometer and related apparatus may be provided to afford toe readings remote from the toe measuring unit such as the remote viewing screen referred to above.

It is an object of the present invention to provide apparatus which permits measurement of various wheel alinement angles of automotive vehicle wheels while the front vehicle wheels are rotating so that the measurements reflect normal road-load conditions.

It is a further object of the invention to provide apparatus as last above-mentioned which includes a plurality of sensing arms which contact the side wall of a rotating tire in order to determine the true plane of the wheel thereby permitting measurement of the wheel alinement angles.

A more specific object of the invention is to provide apparatus as described above including mounting means for mounting one or more measuring devices which measure wheel alinement angles such as camber, caster, toe etc., which devices may if desired be of the electrical pendulum type referred to above, the apparatus including a plurality of sensing arms which contact the side wall of a rotating tire in order to determine the true plane of the wheel and control the orientation of the mounting means in accordance with such plane.

The foregoing and other objects and advantages of the invention will be apparent from the following description thereof.

Now, in order to acquaint those skilled in the art with the manner of making and using our invention, we shall describe, in conjunction with the accompanying drawings, a preferred embodiment of the invention.

DESCRIPTION OF THE DRAWINGS

FIG. 1 is a perspective view showing an automotive vehicle mounted on a car rack which is equipped with wheel alining apparatus constructed in accordance with the present invention;

FIG. 2 is a perspective view of a wheel alining unit of the type depicted in FIG. 1, there being one such unit mounted at the front end of each running of the car rack shown in FIG. 1 for association with respective ones of the two front vehicle wheels of an automotive vehicle;

FIG. 3 is an enlarged fragmentary top plan view of the wheel alining unit of the present invention;

FIG. 4 is a vertical sectional view taken substantially along the line 4—4 of FIG. 3;

FIG. 5 is a horizontal sectional view taken substantially along the line 5—5 of FIG. 4;

FIG. 6 is a vertical sectional view taken substantially along the line 6—6 of FIG. 5.

DETAILED DESCRIPTION OF THE INVENTION

Figure 7:
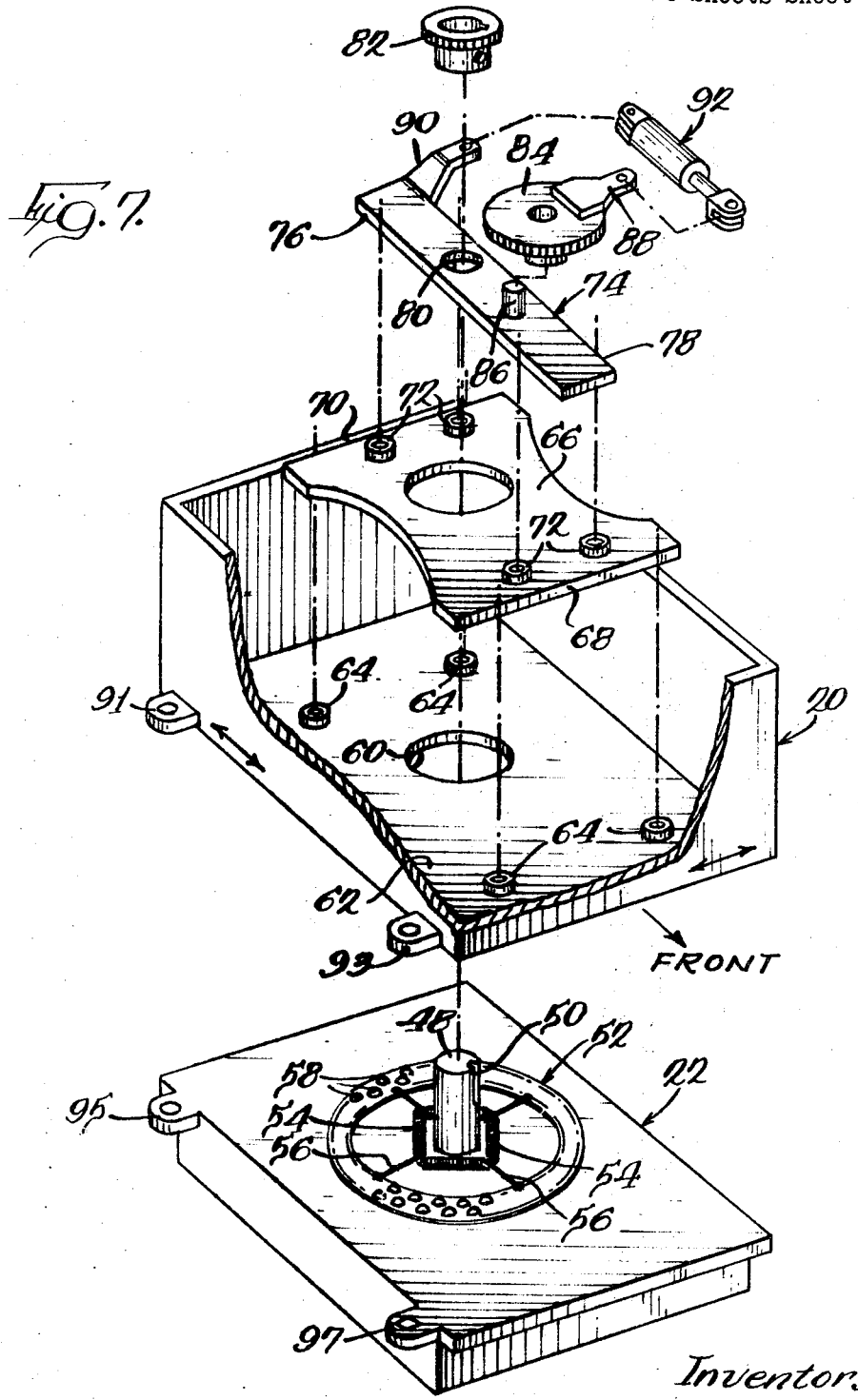
FIG. 7 is an exploded perspective view of the apparatus shown in FIGS. 5 and 6 including a housing member and related apparatus whereby the housing is rendered rotatable and also movable along two linear intersecting axes.

Referring now to the drawings, FIG. 1 shows a car rack 10 including a pair of tracks or runways 12 and 14. A dynamic wheel aligning unit 16 is mounted immediately adjacent the front end of the runway 12, and a similar wheel aligning unit 18 is mounted immediately adjacent the front end of the parallel runway 14. The two wheel alining units 16 and 18 may be substantially identical to one another and thus only the unit 18 will be described in detail herein.

With reference to FIGS. 1 and 2, the wheel alining unit 18 includes a housing 20 which is mounted on a base member 22. As will be described in detail later herein, the housing 20 is rotatable relative to the base member 22 and is also movable relative to the base member along two intersecting horizontal axes, one axis being parallel to the runways 12 and 14 and the other being at right angles thereto. The base member 22 is adjustably movable transversely relative to the runways 12 and 14 by means of a crank 24, the base member being mounted on a pair of rails or tracks 26 and 28 which extend transversely across the front of the rack member 10. The purpose in the latter feature is to permit lateral or transverse adjustment of the position of the wheel alinement unit 18 in accordance with the tread width of the automotive vehicle to be checked.

It will be understood that once the base member 22 is properly located on the tracks 26 and 28 through operation of the crank 24, in accordance with the tread width of the vehicle, the base member 22 then remains stationary during the checking of the wheel alinement angles, although as will be described more fully later herein the housing 20 remains movable relative to such base member. It will further be understood that while the base member associated with the opposite wheel alinement unit 16 may be made for similar transverse adjustment if desired, such adjustability is not required and the latter base member may be mounted in a stationary fashion on the rails 26 and 28.

FIG. 2 shows a pair of rolls 30 and 32 rotatably mounted within the upper portion of the housing box 20 and arranged in spaced apart parallel relation transverse to the length of the runway 14. The rolls 30 and 32 are disposed approximately at the height of the runway 14 so that a vehicle C can be driven beyond the end of the runway and over a ramp 34 so as to dispose the right front vehicle wheel W in a supported position on the two rolls 30 and 32 as shown in FIG. 2. FIG. 3 shows a drive motor 36 mounted within the housing box 20. The motor 36 acts through a motor pulley 38, a drive belt 40 and a pulley 42 to drive a gear reducer 44, and the latter acts through a drive chain 46 to drive the roll 30. It will be understood that with a vehicle wheel W positioned on the rolls 30 and 32 as shown in FIG. 2, operation of the motor 36 will cause the drive roll 30 to rotate the wheel W at a desired speed, while the roll 32 functions as an idler roll.

In accordance with the present invention the housing box 20 is mounted so that it is free to move along intersecting horizontal axes in order to assume any fore and aft and side to side position as determined by the orientation of a vehicle wheel W supported on the rolls 30 and 32. Thus, the housing box 20 is capable of moving in a horizontal plane along an axis parallel to the runway 14, and it is also capable of movement along a horizontal axis perpendicular to the runway 14. Moreover, for purposes of measuring caster, the housing 20 is capable of rotation about a vertical axis. The manner of mounting the housing box 20 on the base member 22 in order to accomplish the foregoing degrees of movement will now be described more fully hereinbelow.

FIG. 7 shows the base member 22, and there is further shown an upright shaft 48 which is fixed relative to the base 22 and is provided with a key slot 50. A ball-bearing ring member 52 is disposed on the top of the base 22. The ball-bearing ring member 52 is permitted to move in a horizontal plane relative to the fixed shaft 48 but is maintained in an approximate centered position relative to the shaft by a spring assembly including four springs 54 which encompass the shaft 48 and are connected to the ring 52 by connecting members 56. A plurality of balls 58 are mounted in the ring 52, and the housing box 20 is mounted on top of the base member 22 so as to be supported on the ball members 58, there being provided a central opening 60 in the bottom of the housing box 20 to accommodate the fixed shaft 48. The opening 60 is substantially larger in diameter than the shaft 48 in order to permit movement of the housing box 20 in a horizontal plane relative to such shaft.

The housing box 20 includes a base portion 62 to which four guide rollers 64 are rotatably mounted. A guide plate 66 is supported on the housing base 62 (see FIGS. 5 and 7) and the guide plate includes oppositely disposed edge portions 68 and 70 which are disposed inside of the rollers 64 and are guided thereby. Consequently, the housing box 20 is movable from left to right and vice versa as viewed in FIG. 5, such movement being transverse to the runway 14 as viewed in FIG. 1, and during such movement of the housing box relative to the guide plate 66 the housing is guided by the cooperation between the rollers 64 and the plate 66.

The guide plate 66 has four rollers 72 mounted thereon, and above the plate 66 there is mounted a relatively long narrow plate 74 having edge portions 76 and 78 which fit inside the rollers 72. The plate 74 has an opening 80 formed therein to accommodate the upright shaft 48, and the opening 80 is approximately of the same diameter as the shaft 48 so that no linear movement of the plate 74 is permitted relative to such shaft. However, the housing box 20 is permitted to move fore and aft parallel to the runway 14 as viewed in FIG. 1, such movement being upwardly and downwardly as viewed in the plan view of FIG. 5, and during such movement the housing 20 is guided due to the cooperation between the rollers 72 and the guide plate 74, it being understood that the plate 66 moves in the fore and aft direction conjointly with the housing box 20.

Still referring to FIGS. 5 and 7, a gear 82 is mounted above the plate 74 on the shaft 48, and the gear 82 is keyed to the shaft 48 so that the gear will not rotate. A second gear member 84 is mounted on a stud 86 which projects upright from the plate 74, and the latter gear is rotatable on the stud 86 and is provided with a crank arm 88. A corresponding arm 90 is fixed to the end of the plate 74, and a hydraulic piston-cylinder actuator 92 is connected between the two arms 88 and 90. It will be understood with reference to FIG. 5 that when the actuator 92 is extended in length it will effect rotation of the gear 84 in a clockwise direction. The gear 84 is in mesh with the gear 82, and since the latter gear will not rotate, the gear 84 will move around the periphery of the gear 82 in a clockwise direction about the vertical axis of the shaft 48. Consequently, the gear 84 will pull the plate 74 with it and the latter acting through the plate 66 will cause rotation of the housing box 20 in a clockwise direction about the axis of the shaft 48.

In a similar manner, operation of the actuator 92 to shorten the length thereof will produce a rotation of the housing box 20 in a counterclockwise direction about the axis of the shaft 48. As shown in FIG. 5, an indicator plate 94 may be supported on the base member 22 and a pointer 96 may be provided on the housing 20 so as to indicate the rotary position of the housing. As will be explained more fully hereinafter, the actuator 92 is utilized to automatically rotate the housing 20 a predetermined angle in one direction and then in the opposite direction, thereby producing a similar rotation of the vehicle wheel supported on the rolls 30 and 32, for the purpose of making caster measurements. A pair of lugs 91 and 93 are formed on one side of the housing 20 as shown in FIG. 5, and a corresponding pair of lugs 95 and 97 are formed on the base member 22. By inserting pin members through the lugs such as shown at 99 in FIG. 4 it is possible to lock the housing 20 against rotation except when caster readings are to be made.

It will be understood from the foregoing that the housing box 20 is capable of floating forwardly and rearwardly relative to the base member 22, such movement being parallel to the runway 14, and during such movement the plate 66 moves with the housing and the housing is guided by the cooperation of the rollers 72 with the plate member 74, the latter member not being movable in a fore and aft direction. The housing box 20 is also capable of floating from side to side relative to the base member 22, such movement being transverse to the runway 14, and during such movement the housing box is guided by the cooperation of the rollers 64 and the plate member 66, the latter member not being movable in a side to side direction. In addition to the fact that the housing box 20 can float on the ball race member 52 in a horizontal plane along two intersecting axes, the housing can also be automatically rotated in either direction about the axis of the shaft 48 upon operation of the actuator member 92.

Reference is now made to FIGS. 2, 3 and 4 which illustrate a sensing arm assembly 98 which is supported from the housing box 20. A pair of horizontal mounting rods 100 and 102 project laterally outwardly from the housing 20 and are supported by the latter for conjoint movement therewith. A horizontal support base 104 is mounted on the shafts or rods 100 and 102 and is slidably movable thereon for purposes of lateral adjustment, the support base being provided with a pair of knobs 106 and 108 which permit clamping the support base in a selected fixed position on the rods 100 and 102. A pair of curved support arms 110 and 112 have their lower ends pivotally supported on the base member 104 at 114 and 116, and the arms extend upwardly and inwardly therefrom. A bar 118 of approximately rectangular cross section extends between the upper ends of the support arms 110 and 112 and has its opposite ends rotatably journaled in the support arms.

A sensing arm unit 120 comprises three sensing arm members 122, 124 and 126 having rollers 128, 130 and 132 mounted on the ends thereof respectively. The three arm members 122, 124 and 126 extend from a common base portion or yoke 134 which is bifurcated so as to form upper and lower lugs 136 and 138 which straddle the rectangular bar 118 and are pivotally connected thereto by a vertical hinge pin 140. It will thus be understood that the sensing arm unit 120 is in effect capable of universal movement since it can pivot with the bar 118 about the horizontal axis of the latter and it can also pivot about the approximately intersecting vertical axis of the hinge pin 140.

As shown in FIGS. 2, 3 and 4, the upper roller 130 is arranged to contact the side wall of the vehicle wheel tire near the top thereof, while the rollers 128 and 132 engage the side wall of the tire at oppositely spaced locations each of which is approximately 90 degrees removed from the upper contact area. It will be noted that the upper roller 130 is rotatable about an approximately vertical axis (while the two side rollers 128 and 132 are rotatable about approximately horizontal axes.

The sensing arm assembly 98 is movable to an inoperative position by simply swinging the arms 110 and 112 away from the vehicle tire about the pivots 114 and 116 as shown in dash lines in FIG. 4 until the arms engage against a flange portion 142 on the support base 104. In the latter position the rollers 128, 130 and 132 will be disposed away from the tire sidewall, but it will be understood that once a vehicle is in position to be checked with its wheel supported on the two rolls 30 and 32, it is then a simple matter to manually swing the sensing arm assembly 98 into the operative position as shown in solid lines in FIG. 4.

The rollers 128, 130 and 132 are of course adapted to continually engage the tire sidewall while the latter is being rotated by the drive rolls 30, and due to their contact with the tire sidewall at three different locations thereon their position will define a plane which is parallel to the plane of the vehicle wheel. A mounting shaft 144 is provided on the base portion 134, and a camber-caster measuring device 146 is mounted on the shaft 144, the device 146 being hung on the shaft 144 so as to be free to pivot thereon. The device 146 may be of the electrical pendulum type as described in the above-mentioned U.S. Pat. 2,765,540.

It will thus be understood that the three sensing arms with the rollers 128, 130 and 132 mounted thereon engage the tire sidewall of the rotating wheel W and determine the plane of the wheel, and the shaft 144 which mounts the measuring device 146 will then be oriented perpendicular to the plane of the wheel so as to be capable of making accurate camber and caster measurements in the manner described in the foregoing U.S. Pat. 2,765,540. Because the sensing arm unit 98 can pivot about the vertical axis of the hinge pin 140, and about the horizontal axis of the bar 118, it is capable of assuming any position as determined by the plane of the vehicle wheel, and as described earlier herein the housing box 20 is capable of floating in a horizontal plane both fore and aft and side to side as determined by the position of the wheel supported on the rollers 30 and 32. In addition to the foregoing, an electrical toe measuring device 148 may be attached to the camber-caster device 146 for the purpose of providing toe measurements. The toe measuring device 148 may be of the electrical pendulum type as described in the above-mentioned pending patent application Ser. No. 607,274, filed Jan. 4, 1967.

In the making of the foregoing measurements, it is advantageous that the rollers 128, 130 and 132 engage the tire sidewall at a location high enough to avoid any inaccuracy due to bulging in the tire as will occur near the lower end thereof. Accordingly, it is preferable that the two side rollers 128 and 132 engage the tire sidewall at least approximately half way up on the tire, i.e., at or above the horizontal centerline of the wheel. It will be noted that the height at which the rollers engage the tire sidewall can be controlled through adjustment of the position of the base support 104 on the rods 100 and 102, since movement of the base member 104 toward the wheel will raise the height of the roller contact locations.

With reference to FIG. 3, there are provided a pair of guide rolls 150 and 152 each pivotally mounted at one end such as shown at 154 and carried by adjustable linkage members 156 and 158 at their opposite ends. Once a vehicle has been driven into position for testing so that the wheel W is supported for rotation on the rolls 30 and 32, the two guide rolls 150 and 152 may be swung into engagement with opposite sides of the tire near the bottom thereof and may be clamped into position thereby serving to prevent lateral movement of the wheel relative to the housing box 20.

In operation, the sensing arm assembly 98 when not in use is retracted into a self-storage position with the support arms 110 and 112 retracted into engagement with the flange 142 as indicated in dash lines in FIG. 4, in which position the sensing arm unit 120 will pivot in a clockwise direction about the axis of the bar 118 until the toe measuring device 148 engages against the arms 110 and 112, thereby assuming the self-storage position. If necessary, the crank 24 may be operated to adjust the lateral position of the unit 18 in accordance with the tread width of a vehicle to be checked. When a vehicle to be checked is driven onto the rack 10, it is located with the front wheels supported on the respective wheel alinement units 16 and 18, for example with the right wheel supported on the rolls 30 and 32 so as to be nested therebetween. The roll guides 150 and 152 are then moved into position against the opposite sides of the tire and clamped in such position. The wheel alinement unit 18 is then manually pivoted about the pivots 114 and 116 so as to bring the rollers 128, 130 and 132 into engagement with the tire sidewall as shown in FIG. 4. The height of the roller contact areas may be adjusted if necessary by adjusting the position of the carriage 104 on the rods 100 and 102.

In order to make a camber test the motor 36 is operated to drive the roll 30 and thereby effect rotation of the vehicle wheel. By way of example, the motor 36 may be operated at 1750 r.p.m. to act through the gear reducer 44 and drive the roll 30 at 58 r.p.m. which in turn will then rotate the vehicle wheel at approximately 3 miles per hour. The rotation of the wheel allows the rollers 128, 130 and 132 to follow the irregular action of the tire sidewall, such irregularity being caused by wheel and tire lateral eccentricity and wheel spindle inaccuracy. The camber measurement is provided by the device 146, and as previously described the reading may be displayed on a viewing screen (not shown) remote from the device. When making dynamic camber readings in accordance with the present invention, the camber is read as the mean average of the total spread of eccentricity on the indicator scale. The same is true in making caster and toe readings.

It is important to note that the location of the universal joint pivots 118 and 140 relative to the pivot axis of the pivots 114 and 116 is preferably determined so as to provide a predetermined moment about the latter axis due to the weight of the wheel alinement unit. In other words, the pressure exerted by the contact rollers 128, 130 and 132 against the tire sidewall should not unduly depress the resilient sidewall, but on the other hand the pressure should be sufficient to cause the rollers to be in uniform contact with the tire. Toe readings are also preferably made with the wheels in a dynamic condition, and the toe readings are provided by the toe measuring device 148 as above described.

In order to provide caster readings, the hydraulic double-acting cylinder 92 is operated to swing the wheels first a predetermined angle in one direction and then through a similar angle in the opposite direction, the caster being determined by noting the variation in camber readings as is conventional in the art. However, with the present device, an infinitely variable controlled reversing hydraulic pump (not shown) or the like may be used to actuate the hydraulic cylinder 92 so as to automatically rotate the wheels for purpose of making a caster reading, such apparatus permitting the stopping of the wheel swing at any desired position within the total range of the apparatus. Caster and turning radius measurements are preferably made with the wheel in static condition.

While we have described our invention in certain preferred forms, we do not intend to be limited to such forms except insofar as the appended claims are so limited, since modifications coming within the scope of our invention will be readily apparent to those skilled in the art, particularly with our disclosure before them.

We claim:

1. Wheel alinement apparatus for testing the alinement of vehicle front wheels while the latter are being rotated, the improvement comprising, in combination, housing means including means for supporting a vehicle wheel and rotating the same, a sensing arm unit having three sensing arm means each having engaging means at the end thereof for engagement with the tire sidewall of a wheel to be checked, said engaging means engageable with said tire sidewall while the wheel is being rotated thereby to determine the plane of the wheel, and a measuring device carried by said sensing arm unit and responsive to the orientation of the latter for measuring the alinement of said vehicle wheel, said sensing arm unit being supported from said housing, and said housing being mounted for rotation about a vertical axis for purposes of measuring caster.

2. Wheel alinement apparatus for testing the alinement of vehicle front wheels while the latter are being rotated, the improvement comprising, in combination, housing means including means for supporting a vehicle wheel and rotating the same, a sensing arm means each having engaging means at the end thereof for engagement with the tire sidewall of a wheel to be checked, said engaging means being engageable with said tire sidewall while the wheel is being rotated thereby to determine the plane of the wheels, a measuring device carried by said sensing arm unit and responsive to the orientation of the latter for measuring the alinement of said vehicle wheel, said sensing arm unit being supported from said housing and said housing being mounted for rotation about a vertical axis for purposes of measuring caster, and drive means associated with said housing for automatically rotating the same about said vertical axis through a predetermined angle in two opposite directions, said rotation of said housing producing rotation of said means within said housing for supporting said vehicle wheel thereby producing turning of said wheel inwardly and outwardly.

3. Wheel alinement apparatus for testing the alinement of vehicle front wheels while the latter are being rotated, the improvement comprising, in combination, housing means including means for supporting a vehicle wheel and rotating the same, a sensing arm unit having three sensing arm means each having engaging means at the end thereof for engagement with the tire sidewall of a wheel to be checked, said engaging means being engageable with said tire sidewall while the wheel is being rotated thereby to determine the plane of the wheel, support means extending horizontally from said housing for supporting said sensing arm unit, said sensing arm unit being adjustably movable along the length of said support means toward and away from said vehicle wheel in order to determine the height at which said engaging means engage said tire sidewall, and a measuring device carried by said sensing arm unit and responsive to the orientation of the latter for measuring the alinement of said vehicle wheel, said sensing arm unit being supported from said housing, and said housing being mounted for rotation about a vertical axis for purposes of measuring caster.

4. Wheel alignment apparatus for testing the alinement of vehicle front wheels while the latter are being rotated, the improvement comprising, in combination, housing means including means for supporting a vehicle wheel and rotating the same, a sensing arm unit having three sensing arm means each having roller means at the end thereof for engagement with the tire sidewall of a wheel to be checked, said three roller means being arranged with one at the top mounted for rotation about a substantially vertical axis and two at opposite sides mounted for rotation about substantially horizontal axes, said roller means being engageable with said tire sidewall while the wheel is being rotated thereby to determine the plane of the wheel, said sensing arm unit being supported from said housing and said housing being mounted for rotation about a vertical axis for purposes of measuring caster, and a measuring device carried by said sensing arm unit and responsive to the orientation of the latter for measuring the alinement of said vehicle wheel.

5. The invention of claim 4 where said housing is mounted for free floating movement in a horizontal plane along a pair of intersecting axes.

6. The invention of claim 4 where said sensing arm unit is supported from said housing by universal joint means which permits said sensing arm unit to pivot about approximately horizontal and vertical intersecting axes thereby permitting said sensing arm unit to adjust its position with the three roller means defining a plane parallel to the plane of the vehicle wheel.

7. The invention of claim 4 including a support arm which is pivotally mounted at its lower end for movement about a generally horizontal axis toward and away from said wheel, said sensing arm unit being supported at the upper end of said support arm by universal joint means which permits said sensing arm unit to pivot relative to said support arm about approximately horizontal and vertical intersecting axes thereby permitting said sensing arm unit to adjust its position with the three roller means defining a plane parallel to the plane of the vehicle wheel, said support arm being supported from said housing and being pivotally movable about its lower end to permit said sensing arm unit to be swung to an inoperative storage position with said roller means spaced away from said vehicle wheel.

8. The invention of claim 4 including drive means associated with said housing for automatically rotating the same about a vertical axis through a predetermined angle in two opposite directions, said rotation of said housing producing rotation of said means within said housing for supporting said vehicle wheel thereby producing turning of said wheel inwardly and outwardly.

9. The invention of claim 4 including support means extending horizontally from said housing for supporting said sensing arm unit, said sensing arm unit being adjustably movable along the length of said support means toward and away from said vehicle wheel in order to determine the height at which said roller means engage said tire sidewall.

10. The invention of claim 4 where said sensing arm unit includes a mounting shaft arranged perpendicular to the plane defined by said three roller means, said mounting shaft thus being perpendicular to the plane of said vehicle wheel while the latter is rotating, and said measuring device being carried on said mounting shaft.

11. Wheel alinement apparatus for testing the alinement of vehicle front wheels while the latter are being rotated, the improvement comprising, in combination, housing means including means for supporting a vehicle wheel and rotating the same, a sensing arm unit having three sensing arms each having roller means at the end thereof for engagement with the tire sidewall of a wheel to be checked, said three roller means being arranged with one at the top mounted for rotation about a substantially vertical axis and two at opposite sides mounted for rotation about substantially horizontal axes, said roller means being engageable with said tire sidewall while the wheel is being rotated thereby to determine the plane of the wheel, a support arm which is pivotally mounted at its lower end for movement about a generally horizontal axis toward and away from said wheel, said sensing arm unit being supported at the upper end of said support arm by universal joint means which permits said sensing arm unit to pivot relative to said support arm about approximately horizontal and vertical intersecting axes thereby permitting said sensing arm unit to adjust its position with the three roller means defining a plane parallel to the plane of the vehicle wheel, said support arm being supported from said housing and being pivotally movable about its lower end to permit said sensing arm unit to be swung to an inoperative storage position with said roller means spaced away from said vehicle, said housing being mounted for rotation about a vertical axis for purposes of measuring caster and also being mounted for free floating movement in a horizontal plane along a pair of intersecting axes, a mounting shaft carried by said sensing arm unit and arranged perpendicular to the plane defined by said three roller means, said mounting shaft thus being perpendicular to the plane of said vehicle wheel while the latter is rotating, and a measuring device carried by said mounting shaft and responsive to the orientation of the latter for measuring the alinement of said vehicle wheel.

12. The invention of claim 11 including drive means associated with said housing for automatically rotating the same about a vertical axis through a predetermined angle in two opposite directions, said rotation of said housing producing rotation of said means within said housing for supporting said vehicle wheel thereby producing turning of said wheel inwardly and outwardly.

13. The invention of claim 11 including support means extending horizontally from said housing for supporting said support arm, said support arm being pivotally mounted at its lower end to said support means, said support arm and the sensing arm unit carried thereby being adjustably movable along the length of said support means toward and away from said vehicle wheel in order to determine the height at which said roller means engage said tire sidewall.

14. Wheel alinement apparatus for testing the alinement of vehicle front wheels while the latter are being rotated, the improvement comprising, in combination, housing means including means for supporting a vehicle wheel and rotating the same, a sensing arm unit having three sensing arm means each having roller means at the end thereof for engagement with the tire sidewall of a wheel to be checked, said roller means being engageable with said tire sidewall while the wheel is being rotated thereby to determine the plane of the wheel, said three roller means being arranged with one roller at the top mounted for rotation about a substantially vertical axis and two rollers at opposite sides mounted for rotation about substantially horizontal axes, said sensing arm unit including a mounting shaft arranged perpendicular to the plane defined by said three roller means, said mounting shaft thus being perpendicular to the plane of said vehicle wheel while the latter is rotating, and a measuring device mounted on said mounting shaft and responsive to the orientation of the latter for measuring the alinement of said vehicle wheel.

15. The invention of claim 14 where said housing is mounted for free floating movement in a horizontal plane along a pair of intersecting axes.

16. The invention of claim 14 where said sensing arm unit is supported from said housing by universal joint means which permits said sensing arm unit to pivot about approximately horizontal and vertical intersecting axes thereby permitting said sensing arm unit to adjust its position with the three roller means defining a plane parallel to the plane of the vehicle wheel.

17. The invention of claim 14 including a support arm which is pivotally mounted at its lower end for movement about a generally horizontal axis toward and away from said wheel, said sensing arm unit being supported at the upper end of said support arm by universal joint means which permits said sensing arm unit to pivot relative to said support arm about approximately horizontal and vertical intersecting axes thereby permitting said sensing arm unit to adjust its position with the three roller means defining a plane parallel to the plane of the vehicle wheel, said support arm being supported from said housing and being pivotally movable about its lower end to permit said sensing arm unit to be swung to an inoperative storage position with said roller means spaced away from said vehicle wheel.

References Cited
UNITED STATES PATENTS

| | | | |
|---|---|---|---|
| 2,777,211 | 1/1957 | Martin | 33—203.13 |
| 2,953,857 | 9/1960 | Mineck | 33—203.12 |
| 3,079,695 | 3/1963 | Mineck | 33—203.12 |
| 3,305,935 | 2/1967 | Cady et al. | 33—203.13 |

WILLIAM D. MARTIN, JR., Primary Examiner

U.S. Cl. X.R.

33—203.17